US008684828B1

(12) United States Patent
Coronel et al.

(10) Patent No.: US 8,684,828 B1
(45) Date of Patent: Apr. 1, 2014

(54) METHOD, SYSTEM, AND DEVICE FOR MANAGING GAME FEATURES

(71) Applicants: Jack Bertram Coronel, Las Vegas, NV (US); Joseph R Coronel, Las Vegas, NV (US); DeWayne Wooten, Las Vegas, NV (US)

(72) Inventors: Jack Bertram Coronel, Las Vegas, NV (US); Joseph R Coronel, Las Vegas, NV (US); DeWayne Wooten, Las Vegas, NV (US)

(73) Assignee: JRC Holdings, LLC, Las Vegas, NV (US)

( * ) Notice: Subject to any disclaimer, the term of this patent is extended or adjusted under 35 U.S.C. 154(b) by 0 days.

(21) Appl. No.: 13/843,788

(22) Filed: Mar. 15, 2013

(51) Int. Cl.
*A63F 13/00* (2006.01)

(52) U.S. Cl.
USPC ................... 463/25; 463/16; 463/19; 463/20; 463/22; 463/26; 463/27; 463/39; 463/40; 463/42; 463/43

(58) Field of Classification Search
USPC .............................. 463/16–23, 25–27, 39–43
See application file for complete search history.

(56) References Cited

U.S. PATENT DOCUMENTS

| | | | | |
|---|---|---|---|---|
| 8,342,944 | B2 * | 1/2013 | Gagner et al. | 463/25 |
| 8,357,039 | B2 * | 1/2013 | Anderson et al. | 463/29 |
| 2006/0160614 | A1 * | 7/2006 | Walker et al. | 463/29 |
| 2008/0146341 | A1 * | 6/2008 | Hill et al. | 463/42 |
| 2008/0300049 | A1 * | 12/2008 | Anderson et al. | 463/25 |
| 2009/0239657 | A1 * | 9/2009 | Ryan et al. | 463/25 |

* cited by examiner

*Primary Examiner* — Sunit Pandya
(74) *Attorney, Agent, or Firm* — Robert Ryan Morishita; Morishita Law Firm, LLC

(57) ABSTRACT

A method and system for awarding game features includes a first game device and a second game device. An achievement game including an achievement outcome is conducted on the first game device. In an optional embodiment, the achievement game is a non-wagering game and the first game device is a personal device. A game including a base game and at least one optional feature is conducted at a second game device. The second game device receives any achievement outcomes earned in the achievement game and determines, optionally with input from the user, which optional features to apply to the base game. In an optional embodiment, the game is a wagering game and the second game device is a gaming machine.

18 Claims, 3 Drawing Sheets

METHOD, SYSTEM, AND DEVICE FOR MANAGING GAME FEATURES

FIELD OF THE INVENTION

The present invention relates to methods, systems, and devices for managing data. More specifically, some embodiments of the present invention relate to methods, systems, and devices for managing features for activities on a first device, such as a mobile device, in which the features may be used for activities on a second device, such as a gaming machine.

BACKGROUND OF THE INVENTION

The word "gaming" refers to two different concepts in the entertainment industry. In one context, sometimes referred to as entertainment gaming, the word "gaming" refers to computer or video games in which play is conducted from a gaming console, arcade machine, personal computer, cellular telephone, personal digital assistant ("PDA"), or the like. In entertainment gaming, the player usually exercises skill, logic, strategy, and luck to influence the outcome of the game. Games within the entertainment gaming genre may take many different forms, including games for individuals to compete against a computer-controlled opponent (or a standard, such as a game timer or minimum score), games for individuals to compete against other individuals, games for teams to compete against other teams, or the like. While some games involve some payment, the payment is not a "wager." That is, entertainment games usually require a payment for the purchase or license of the game and/or a payment to play the game in a specific forum, such as specially designated networks or the like. However, such a payment is not in the form of a wager since the payment is typically not staked for participation in the game and typically is not used to determine eligibility for a tangible prize.

Entertainment games may be conducted in single player or multi-player environments with each player playing the game at a separate terminal, such as a personal computer, that communicates with a server coordinating the game. Massively Multi-player Online Games ("MMOG") such as World of Warcraft™ and EverQuest™ are examples of games with multi-player play. Real time simulation ("RTS") games such as Farmville™ and Mafia Wars™ are examples of games with multi-player social interaction. The advent of social networking websites, such as Facebook™, has drawn even more players to games with multi-player play and/or multi-player social interaction. Many of these games form virtual communities including virtual economies in which players can purchase in-game items and products for use in the game.

The word "gaming" may also be used to refer to wagering games. Regardless of whether the gaming occurs in a physical, brick-and-mortar casino or a virtual, online casino, these types of casino or wagering games usually include three components: a wager, chance, and a reward. That is, casino or wagering games are usually games in which the outcome of a wager, that is, the reward, is determined by chance, which predominates over every other factor, including skill. For example, chance predominates in card games such as poker, blackjack, or the like, even though some skill is involved. Specifically, chance, rather than the player's skill, determines which cards are dealt to the players, which cards are dealt to a dealer, if any, which cards are cut from the deck or shoe of cards, and so forth. In other wagering games, such as reel slot games, numbers games (such as keno, lotto, pull tabs, or the like), dice games, wheel games (such as roulette), or the like, chance is practically the only factor to determine the outcome of the wagering game, with skill having no influence on the symbols or numbers drawn, rolled, or spun.

As may be appreciated, the outcomes of wagering games can usually be determined by the strict probabilities that govern the games and, therefore, the hold for the game operator over the long term can be predicted. As may further be appreciated, this may not be true for skill games, in which the outcomes would vary from player to player based on the player's skill. As may be appreciated, wagering games must be operated for a profit over the long term and would generally not operate games that allow certain players to improve their performance through practice. Consequently, casinos will not, and in some jurisdictions cannot, offer games in which skill predominates.

A well-known consequence of how probability can affect online casinos is that online casinos require massive volumes of players to maintain liquidity. That is, house-banked games, i.e., those games in which the online casino operator banks wagers by collecting losing wagers and paying winning wagers, are particularly profitable for casinos because the games include a built-in house edge that guarantees the game will be profitable in the long term. However, the win or loss from these games can fluctuate wildly in the short term, such as when a player has a winning streak, and the casino operator must maintain a reserve of cash to pay off all winning bets. Conversely, player-banked and parimutuel games are more predictable in the short term because the casino operator does not collect losing wagers and pay winning wagers. Rather, in a player-banked game a player-banker banks the other players' wagers and in a parimutuel game, the players contribute to a pot that is awarded to the winning player(s). In either case, the casino operator collects a fee for administering and operating the game. This fee is levied regardless of the outcome of the game, so the casino operator makes money on every game. However, because the fee is generally low, the casino operator must generally have a high volume of play to be profitable.

SUMMARY OF THE INVENTION

Some embodiments of the present invention include a system and method for conducting a game for at least one player. In one optional embodiment, the system includes a first game device having a first game device interface. The first game device executes program instructions to conduct an achievement game. The achievement game includes at least one achievement outcome that may be earned through the achievement game. In an optional embodiment, the achievement game may be free to play, fee to play, fee to download, or the like. In an optional embodiment, no wager is accepted or allowed in the achievement game.

A system also includes a second game device having a second game device interface. In an optional embodiment, the second game device is different from a first game devices. The second game device executes program instructions to conduct a game that includes at least a base game and at least one optional feature which alters the base game. In an optional embodiment, the optional features may include exclusive optional features. In a further optional embodiment, the optional features may include exclusive optional features and non-exclusive optional features.

The second game device receives the achievement outcome, if any, earned in the achievement game conducted at the first game device. In one optional embodiment, the achievement outcome is received at the second game device directly from the first game device. For example, the achievement outcome could be received through a communication device, e.g., receiver, at the second game device from a communication device, e.g., transmitter, at the first game device. In another optional embodiment, a system includes a server in communication with a first game device and a second game device. In one such optional embodiment, the achievement outcome is transferred from the first game device to a second game device via a server, i.e., transferred from a first game device to a server, which in turn transfers it to second game device.

The second game device determines the optional feature, if any, associated with any achievement outcome received and conducts the base game including any optional feature associated with any achievement outcome received.

In one optional embodiment discussed above, the game may include a plurality of exclusive optional features. In one such optional embodiment, the second game device conducts the base game including at least one of the exclusive optional features only when the associated achievement outcome is received by the second game device. Otherwise the second game device conducts only the base game.

In another or further optional embodiment discussed above, the optional features include exclusive optional features and non-exclusive optional features. In one such optional embodiment, the second game device conducts the base game including at least one of the exclusive optional features only when the associated achievement outcome is received by the second game device. Otherwise the second game device conducts the base game including non-exclusive optional features.

In either case, the second game device may select optional features to be conducted with the base game or the second game device may receive an election through the second game device interface to select optional features to be conducted with the base game.

DESCRIPTION

Figure 1:
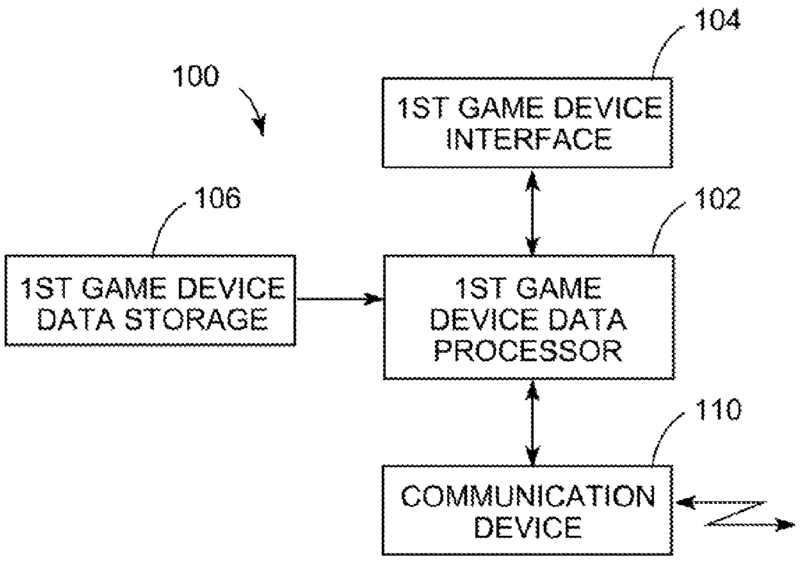
FIG. 1 is a block diagram of a first game device according to an embodiment of the present invention.
Figure 2:
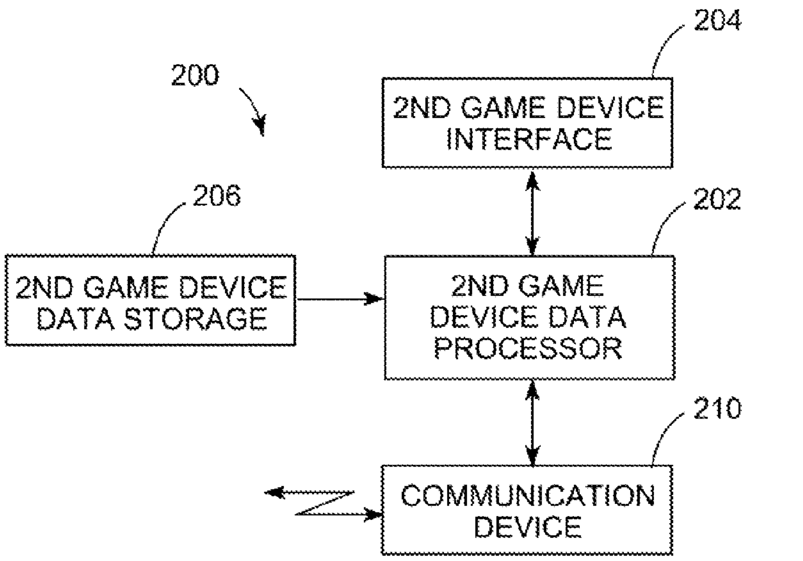
FIG. 2 is a block diagram of a second game device according to an embodiment of the present invention.
Figure 3:
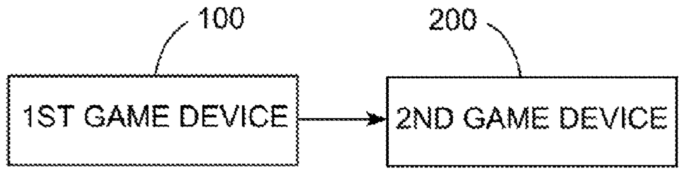
FIG. 3 is a block diagram of a system according to an embodiment of the present invention.
Figure 4:
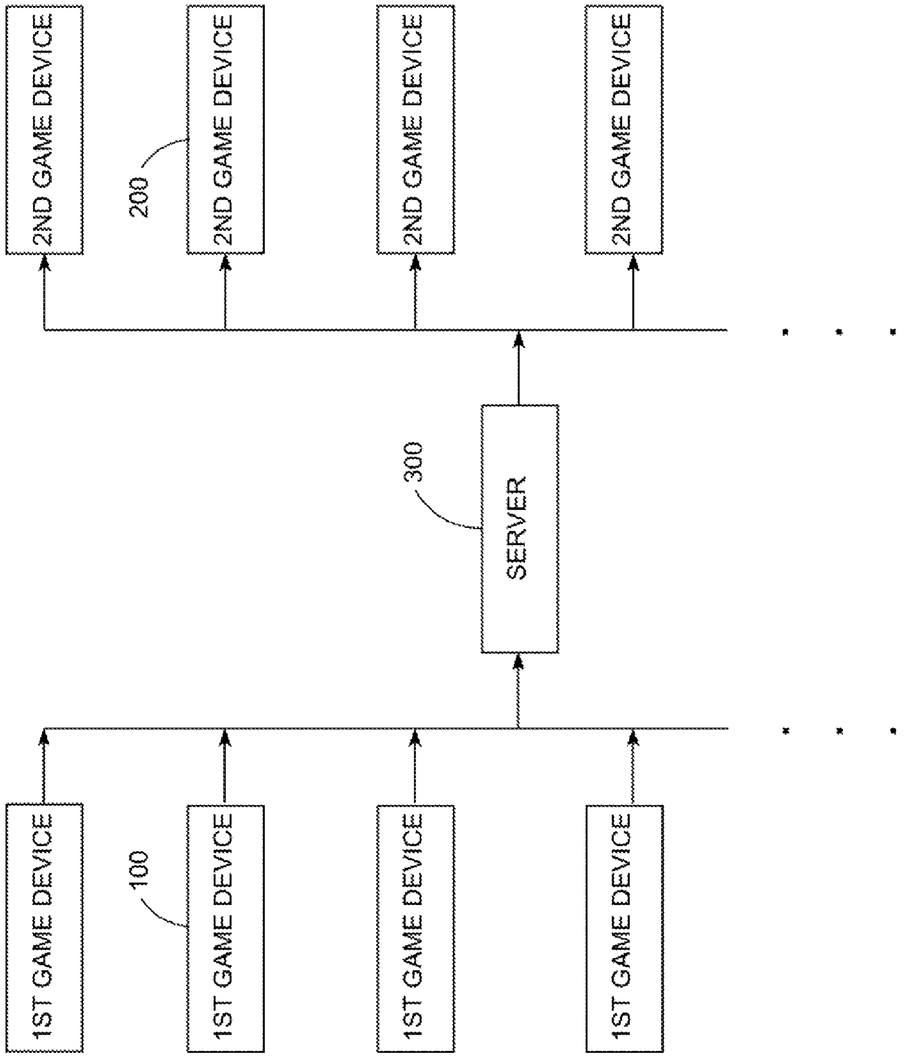
FIG. 4 is a block diagram of a system according to an embodiment of the present invention.
Figure 5:
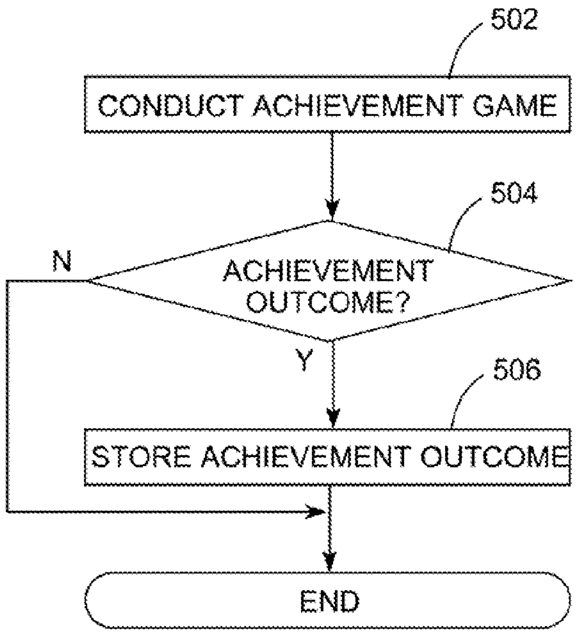
FIG. 5 is a flowchart of a method according to an embodiment of the present invention.
Figure 6:
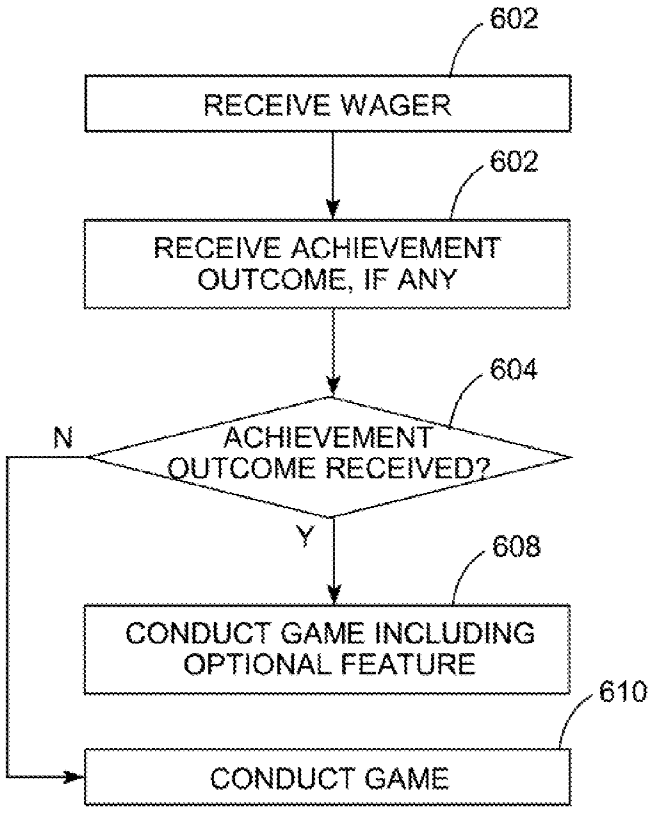
FIG. 6 is a flowchart of a method according to an embodiment of the present invention.

Reference is now made to the figures wherein like parts are referred to by like numerals throughout. Referring to FIGS. 1-6, an embodiment of the present invention includes a system and method for linking activity in an achievement game to activity in a game. In one such optional embodiment, the system and method links activity in an achievement game to activity in a wagering game.

An embodiment of the present invention may be applied to any achievement game and a different, second game. That is, embodiments of the present invention described herein are not dependent on the specific achievement game and the other game(s) involved, regardless of whether the other game(s) involved include wagering or non-wagering games. For example, in one optional embodiment, the present method may be applied to any wagering game in which a wager is staked for a chance to win an award and any achievement game, whether the achievement game is free-to-download, free-to-play, fee-to-download, fee-to-play, or any combination thereof. In an optional embodiment, the achievement game is a non-wagering game in which no wager is staked although, as previously noted, it is contemplated that the non-wagering game may be free, require a subscription or fee, or require other consideration for play (e.g., joining a loyalty program, submitting data used for marketing, making a purchase, or the like). It is also noted that although no wager is staked in the non-wagering game, it is contemplated that prizes, whether tangible (such as a good, service, currency, or the like) or promotional (discounts, play currency, or the like) in nature may be offered as awards in the non-wagering game. Additionally, the non-wagering game may include a virtual economy in which real or virtual money can be used or exchanged for in-game thematic or game play elements. For example, role playing games such as World of Warcraft™ and Club Penguin™ have virtual economies in which in-game thematic or game play elements can be purchased by a user.

In an optional embodiment, users may be provided a price selection among achievement games. In an optional embodiment, a first price may be associated with an achievement game and a different second price may be associated with an enhanced achievement game, with the price difference between the first price and the second price going to a designee other than the user selling, sharing, gifting, trading, or exchanging the achievement outcome. For example, the price difference could go to the purchase of a good or service, to be stored as a deferred value, to an investment, to a charity, or the like. It is noted that the enhancement could take any form, including an enhancement to the achievement game, a discount, an additional achievement game, or the like, to provide the user the perception that the second price for the enhanced achievement game is a better bargain than the first price for the achievement game. In this manner, the user is rewarded with additional value (or the perception of additional value) for the second price. However, the price difference between the first price and the second price is directed to something other than the seller of the achievement game. Thus, the price difference could be directed to a charity, a saved or deferred value, an investment, an additional good or service, or the like.

In the examples below, the achievement game may take the form of a game, puzzle, quiz, or other activity. For example, the achievement game may be a puzzle (such as a jigsaw puzzle, crossword puzzle, chess puzzle, or the like), magic number square (such as Sudoku), arcade or video game (such as Angry Birds™), social game (such as Farmville™), role playing game (such as World of Warcraft™), trivia game, or the like.

The achievement game includes one or more achievement outcomes. It is noted that, as used herein, an achievement outcome is not necessarily tied to the end of the achievement game. Rather, it is contemplated that an achievement outcome may occur at any time during the achievement game, including at any point at the beginning, middle, or end of the achievement game. It is also contemplated that an achievement outcome may be obtained over multiple achievement games, or may require multiple achievement games to obtain. For example, an achievement outcome may be earned by a player obtaining a specified score in three or more consecutive achievement games, successfully completing five achievement games in two minutes, finding a specified number of items regardless of the number of achievement games needed to find the items, or the like. As may be appreciated, an achievement game may have multiple achievement outcomes. In one such optional embodiment, the achievement game may take the form of an application (or "app") that is downloaded and installed on a first game device 100.

A first game device 100 may take any form, including a mobile telephone, tablet device, personal digital assistant ("PDA"), personal computer, kiosk, arcade game machine, game console, handheld device, electronic gaming machine, interactive television, or any other electronic device. In one such optional embodiment, a first game device 100 includes a first game device data processor 102 in communication with a first game device interface 104 and a first game device data storage 106. In an optional embodiment, the first game device interface 104 includes an output device, such as a display, and an input device. Optionally, the output device and input device may be combined, such as in a touch screen. In an optional embodiment, the first game device 100 may include a communication device 108, that includes at least a transmitter and/or a receiver.

The system also includes a second game device 200. The second game device 200 may take any form as well. In an optional embodiment, the second game device 200 includes a second game device interface 204. As above, the second game device interface 204 may include an input device and an output device. In an optional embodiment, the input device and output device may be combined, such as in a touch screen. Optionally, the second game device interface 204 is controlled by a second game device data processor 202 in communication with a second game device data storage 206. In an optional embodiment, the second game device 200 also includes a communication device 210.

The form of the second game device 200 may vary depending on the embodiment. In this regard, a system according to some embodiments of the present invention may include a plurality of first game devices 100 and a plurality of second game devices 200, with mixed forms of each. Although the examples below give examples of first game devices 100 as primarily personal devices such as personal computers, mobile telephones, tablets, handheld devices, and the like, and second game devices as primarily casino devices, such as electronic gaming machines, live and electronic gaming tables, electronic and mechanical slot machines, or the like, it is contemplated that many different forms or combinations of forms of first game devices 100 and second game devices 200 may be included within a system.

In one optional embodiment, the first game device data processor 102 and/or second game device data processor 202 may take any form, including a conventional microprocessor. In optional embodiments, either or both data processors may include a random number generator in the form of hardware or firmware, or may execute a random number generator in the form of software. Alternatively, a random number may be generated by a physical process, such as selection of balls from a ball blower, dealing of cards from a card shuffler or card shoe, or the like, generated through a manually triggered interface, or generated in any other fashion. In such an optional embodiment in which either or both data processors use a random number generator, it is contemplated that the random number generator may, at least in part, generate a number in random or quasi-random fashion which, in turn, may be used, at least in part, to produce a random game outcome.

In an optional embodiment, the first game device interface 104 and second game device interface 204 may include a display, including a cathode ray tube ("CRT") monitor, liquid crystal display ("LCD"), organic light emitting diode ("OLED") display, plasma display, television, or the like. The respective data processors 102, 202 may communicate directly or indirectly, such as through a video controller or video card, with the display.

The first game device interface 104 and/or the second game device interface 204 may include an input device to receive input from a user and transmit it to the respective data processor 102, 202. Such an input device may take any form, such as mouse, pointer, keyboard, keypad, button panel, stylus, voice recognition hardware or software, handwriting recognition hardware or software, or the like. In an optional embodiment, the input device may be integrated with a display in a touch screen device.

In an optional embodiment, a first game device interface 104 and/or second game device interface 204 may also include a device to receive wagers and/or purchases of game credits. For example, a first game device interface 104 and/or second game device interface 204 may include a ticket or voucher reader, bill acceptor, coin receiver, magnetic-stripe card reader, smart card reader, bar code scanner, radio frequency identification ("RFID") transceiver, radio wave receiver, transmitter, and/or transceiver (such as WiFi™, Bluetooth™, cellular, or the like), or other device. The player interface 104 may also include an output device to output currency or representations of currency for awards, cash out requests, or the like. For example, the output device could include a ticket or voucher printer, bill or coin dispenser, card encoder, bar code printer, RFID transceiver, radio wave receiver, transmitter, and/or transceiver, or the like. It is noted that, in an optional embodiment, devices may perform multiple functions, such as reading tickets or vouchers and accepting bills.

A communication device 110 may take any form, including a modem, wired or wireless network interface card ("NIC"), or the like. Likewise, a communication device may use any communication method including wired or wireless signals, radio waves, light, laser, sound, image, or the like, and may communicate using any protocol, including TCP/IP, serial communication, cellular, Bluetooth™, or the like. As illustrated in FIGS. 1-6, a system may include direct communication between first game devices 100 and second game devices 200 or may additionally or alternatively include a server 300, which acts as an intermediary. That is, a server 300 may communicate with both first game devices 100 and second game devices 200 to transfer information between first game devices 100 and second game devices 200. It is contemplated that the server 300 may likewise provide additional processing, storage, tracking, and display of information received from first game devices 100 and/or second game devices 200, and may likewise provide access to information received from first game devices 100 and/or second game devices 200.

In an optional embodiment first game device data storage 106 and/or a second game device data storage 206 may take any form including magnetic storage, optical storage, flash storage, or the like. Data storage devices 106, 206 may store executable program instructions executable by the respective data processors 102, 202. For example, a first game device data storage 106 may store executable program instructions to conduct an achievement game, along with graphics, sounds, social media content, and game parameters for conducting the achievement game. Likewise, a second game device data storage 206 may store executable program instructions to conduct a game, along with graphics, sounds, social media content, and game parameters for conducting the game. As suggested above, in an optional embodiment either or both data storage devices 106, 206 may also store executable program instructions to generate a random number. As may be appreciated, the use of a random number combined with an interface that receives wagers and issues pay outs would satisfy most legal definitions of a wagering game, gaming device, gambling device, or similar term. It is further contemplated that data storage devices 106, 206 may be remote from the first game device 100 and/or second game device 200. In one such optional embodiment, game applications for either or both of the achievement game and/or the game may be executed from a "cloud" of remote data storage devices 106, 206 in communication with the first game device 100 and/or second game device 200 via a network or other means of communication. It is contemplated that the first game device 100 and/or second game device 200 may, in such a cloud embodiment, communicate with the application layer storing the achievement game and/or game on a continuous or periodic basis. That is, a first game device 100, second game device 200, or both may execute an achievement game and/or game by maintaining a continuous connection to the application layer of a cloud such that the achievement game and/or game are not stored locally at a first game device 100 and/or second game device 200. Alternatively, a first game device 100, second game device 200, or both may download from the application layer of a cloud some or all of the files necessary to execute an achievement game and/or game such that the achievement game and/or game are executed at least partially in a local computing environment.

As noted above, in an optional embodiment, a system may include a server 300. It is noted that inclusion of a server 300 is entirely optional, as certain optional embodiments omit a server 300 and certain functions within a system including a server 300 would not require use of a server 300. In any event, a server 300 may be configured to perform many different functions, including providing an interface, or interfacing, with a website, such as a social media website, to display and provide access to data and information gathered (whether automatically or upon receipt of a user command) from a first game device 100 and/or second game device 200. A server 300 may also provide tracking and reward functions by storing information gathered from, or input by users at, a first game device 100 and/or second game device 200. In one such optional embodiment, a server may be configured to store user tracking records that store data representing each user's use of a first game device 100 and/or second game device 200. It is contemplated that other activity may be tracked as well. For example, the tracking performed by the server 300 may be integrated with other forms of purchase tracking, activity tracking, or the like. For example, where the first game device 100 and/or second game device 200 is a mobile telephone, activity may be tracked for the volume of the mobile telephone's data and voice usage, purchases made using the mobile telephone, and so forth. In another example, where the first game device 100 and/or second game device 200 is an electronic gaming machine, activity may be tracked for a user's activity at the gaming machine, as well as other activity within the casino, such as at live gaming tables, restaurant, retail, hotel, or other activity outside of the second game device 200. It is contemplated that, in addition to, or in place of, tracking functions, a server 300 may also perform player loyalty and/or player reward functions in which player units (sometimes referred to as "player points"), may be awarded based on user activity. In an optional embodiment, player units are exchangeable for products, services, discounts on products or services, or the like.

In an optional embodiment, a server 300 may also perform financial functions. For example, in an optional embodiment, the server 300 may process, or communicate with a device that processes, financial information for the purpose of performing purchases, wagers, or the like.

Referring to FIGS. 1-6, in some embodiments, the present invention includes a method in which activity at a first game device 100 may result in an achievement outcome usable to enhance, change, or alter a game at a second game device 200. These changes, enhancements, or alterations may be primarily directed to presentation with minimal or no changes in game play, primarily directed to game play with minimal or no changes in presentation, or directed to both presentation and game play. It is further contemplated that changes in game play may alter the underlying mathematical odds of the game by altering, for example, payouts, occurrences of winning outcomes, occurrences of losing outcomes, occurrences of push outcomes, wager values, wager limits, wager denominations, or the like. Alternatively, changes in game play may result in an expected value for the game that is substantially unchanged even if the game or the presentation of the game changes. It is noted that this cross-activity may occur in both directions, with outcomes at the second game device 200 usable to alter a game at a first game device 100. In describing an embodiment of a method below, it is contemplated that the claims encompass a method in which the game devices 100, 200 are reversed or in which the outcomes are exchangeable in both directions, i.e., from a first game device 100 to a second game device 200 and from a second game device 200 to a first game device 100.

In an optional embodiment, a first game device 100 is configured to execute an achievement game. For example, the first game device 100 may be a personal device such as a mobile telephone, tablet device, video game console, or personal computer, and an achievement game may be an application or "app" downloaded and installed on the first game device 100. In an optional embodiment, the achievement game may be free-to-download, fee-to-download, free-to-play, fee-to-play, subscription-to-download, subscription-to-play, or any combination thereof.

The achievement game is conducted for a user at the first game device 100. As noted above, the achievement game may be skill-based, chance-based, or a combination thereof. In an optional embodiment, the achievement may be skill-based or predominated by skill. In this manner, the achievement game may, presumably, be conducted for the user in any geographic location without violating legal prohibitions on gambling. As discussed above, the achievement game may include video games, puzzles, trivia, or other forms of skill-based games. In an optional embodiment, the achievement game may require a fee (or be fee-free) but does not require a wager, i.e., an amount of money staked on the outcome of the achievement game. In an alternate optional embodiment, an achievement game may include a required or optional wager.

The achievement game includes at least one achievement outcome. In conducting the achievement game, the first game device 100 determines whether an achievement outcome has been obtained. As noted above, the achievement outcome may take any form. For example, the achievement outcome may be earned by performing a task within the achievement game, reaching a goal within the achievement game, or otherwise achieving some level of performance within the achievement game. In a further or alternative optional embodiment, achievement outcomes (or the opportunity to earn an achievement outcome) may be obtained, at least in part, randomly. For example, within a video game, an achievement outcome may include finding and obtaining a dynamic item that appears sometimes, but not all the time, with the appearance of the item determined by chance.

It is contemplated that, in an optional embodiment, an achievement game may include solo achievement outcomes, group achievement outcomes, or both solo and group achievement outcomes. Thus, in one optional embodiment, the achievement game is a multi-player game. In optional embodiments in which the achievement game is a multi-player game, the players may cooperate, compete, or a combination thereof to obtain achievement outcomes. In one such optional embodiment, achievement outcomes may require the assistance or participation by other users. For example, in an optional embodiment, the achievement game is a social game in which at least a portion of the game play includes social interaction with other users. In one such optional embodiment, the achievement outcome requires the assistance of, or participation by, other users. In an additional or alternate optional embodiment, players may compete against one another for achievement outcomes. For example, in one optional embodiment, players may challenge one another. The result of the challenge may constitute or relate to a player obtaining an achievement outcome, e.g., an achievement outcome may be awarded when a player wins (or loses) a predetermined type or quantity of challenges. It is contemplated that in such a competitive or quasi-competitive multi-player game, one or more challenges may be unrelated to achievement outcomes but may, nonetheless, result in a token or other recorded event that may be used outside of the achievement game.

In an additional or alternate optional embodiment, players may cooperate. In one such optional embodiment, one or more achievement outcomes may be tasks that can only be performed when two or more players in the multi-player game cooperate, e.g., at least some achievement outcomes may be impossible to accomplish without the cooperation, communication, assistance, or other participation of another player in the achievement game. Such cooperative participation may be simultaneous, e.g., such as a task of reaching an object that cannot be reached by either player alone, sequential, e.g., such as a task of one player finding an object then telling another player how to retrieve it, a combination of simultaneous and sequential cooperation, or time-independent.

In a further optional embodiment, the task may require cooperative, yet competitive, participation by multiple players. For example, a task of demolishing a building may require multiple players to accomplish, but if only one of the players may be awarded an achievement outcome, the players may complete, for example, to fire the key shot that finally demolishes the building.

In yet a further optional embodiment, a task may require cooperation, but the cooperation may not necessarily be coordinated. For example, a task may require players to solve a puzzle with separate players solving separate pieces of the puzzle so that a player is only responsible for his or her puzzle segment and is neither helped nor hindered by other players. It is noted that in such an optional embodiment, time may not be a factor insofar as the puzzle segments may occur simultaneously, sequentially, or independent of time (e.g., each player solves a segment as it is encountered in the game).

It is contemplated that an achievement outcome is not necessarily a "winning" outcome or a "losing" outcome, although it could be tied to either a winning outcome or a losing outcome, and may be independent of winning or losing the achievement game. For example, a user may earn an achievement outcome for completing a task or finding an item within an achievement game, regardless of whether the end result of the achievement game is a "win" or a "loss." In another optional embodiment, the achievement outcome may be specifically tied to one or more wins or losses.

When an achievement outcome is earned through the achievement game, the achievement outcome is stored for later use in combination with a second game device 200. In one optional embodiment, the achievement outcome is stored in the first game device 100. In an alternate or additional embodiment, the achievement outcome is stored at a server 300. By "storing" an achievement outcome, it is contemplated that a server 300 may store data in a database of users and/or first game devices 100 that associates the user and/or first game device 100 with the achievement outcome and/or data representing the achievement outcome. In one such optional embodiment, a database may identify users and/or first game devices 100 in any manner, including by user name, device number (such as mobile telephone number, IMEI number, IMSI number, MAC or network address, or the like), IP address, account number (including accounts that are used for other purposes such as a mobile telephone account, purchase loyalty account, player loyalty/tracking account, financial account, or the like), social media account, or other identifier.

In an optional embodiment, in addition to, or in place of, storing an achievement outcome for later use, a server 300 may store an achievement outcome or data representing an achievement outcome for access by the user, for display by the user, or the like. For example, in an optional embodiment, the achievement outcome may be stored in a unique account and/or a social media account for a user. From that account, the user may view his or her achievement outcomes and display the achievement outcomes to other users of a social media website. In a further optional embodiment, achievement outcomes may be available for trade, gifting, sale, or exchange to other users, such as through a social media website, marketplace, third party exchange, or the like.

In an optional embodiment, achievement outcomes may be associated with price selection similar to the price selection discussed above with respect to achievement games. That is, in an optional embodiment, a first price may be associated with an achievement outcome and a different second price may be associated with an enhanced achievement outcome, with the price difference between the first price and the second price going to a designee other than the user selling, sharing, gifting, trading, or exchanging the achievement outcome. For example, the price difference could go to the purchase of a good or service, to be stored as a deferred value, to an investment, to a charity, or the like.

In an optional embodiment, achievement outcomes may be consumable or non-consumable. Specifically, any achievement outcome that is depleted or debited from a balance as the result of use may be a "consumable" achievement outcome. Conversely, any achievement outcome that is maintained as the result of use or allocation may be a "non-consumable" achievement outcome. Stated another way, achievement outcomes may be consumed after being used to obtain an optional feature for a base game. Similarly, achievement outcomes may not be consumed after being used to obtain an optional feature for a base game, but may rather remain in the user's account to be reused a limited or unlimited number of times. In yet another optional embodiment, non-consumable achievement outcomes may transform after use so that they are not consumed, but do not remain in their original form either. As described in greater detail below, this may mean that the optional features available for a transformed achievement outcome may be different before and after the transformation.

A second game device 200 conducts a game that includes a base game and at least one optional feature. In an optional embodiment, the second game device 200 is a casino game device, such as an electronic gaming device, electronic table game, or the like. Alternatively, the second game device 200 assists with a game, although it does not, by itself, conduct the game. For example, the second game device 200 may be a player tracking terminal at a live table game.

In one optional embodiment, the first game device 100 and second game device 200 are different devices. For example, in one optional embodiment, the first game device 100 is a mobile telephone, personal computer, interactive television, or the like and the second game device 200 is an electronic gaming machine, electronic table game, or the like. In such an optional embodiment, the user may conduct an achievement game at his or her personal device at home, in a hotel room, in a restaurant, or any other non-casino location, to earn achievement outcomes usable in, or on, a game that includes wagering at a gaming machine in a casino location or online. In another optional embodiment, the first game device 100 and second game device 200 are the same device, with the environment changing the nature of the device. For example, the first game device 100 and second game device 200 may be a laptop computer or tablet device which conducts an achievement game in a non-casino location, but can connect to a casino network (optionally a secure casino network) within a casino or remotely to conduct a game that includes wagering.

The second game device 200 receives the achievement outcome. In one optional embodiment, the achievement outcome may be received directly from the first game device 100. For example, the first game device 100 may transmit the achievement outcome stored at the first game device 100 to a receiver at the second game device 200. The various protocols and methods for communicating between the first game device 100 and second game device 200 were described above. In another optional embodiment, the second game device 200 receives the achievement outcome from a server 300. More specifically, the server 300 transfers an achievement outcome received from a first game device 100 to a second game device 200, such that the server 300 acts somewhat as an intermediary between the first game device 100 and second game device 200. It is contemplated that the transfer may occur more or less in real time, or the transfer may be delayed, with the server 300 storing the achievement outcome for at least some time. That is, in one optional embodiment, the user may instruct a first game device 100, such as a mobile telephone, to transmit an achievement outcome currently earned or previously stored on the first game device 100 to a second game device 200 and, in performing the transfer, the first game device 100 uses an intermediary server 300 to transfer the achievement outcome. In another optional embodiment, the user may use a first game device 100 or other mobile device to instruct a server 300 to transfer an achievement outcome stored on the server 300 to a second game device 200. As may be appreciated, such a server 300 could be operated strictly to store and transfer achievement outcomes from a first game device 100 to a second game device 200. In another optional embodiment, a server 300 maintains a profile for a user and stores any earned achievement outcomes in the user's profile. It is contemplated that, in an optional embodiment including a server 300, a first game device 100 and/or second game device 200 may be in continuous communication with the server 300 or may communicate with the server 300 periodically (such as at scheduled intervals, upon command from a user, upon query from the server 300, or the like).

In one example, a server 300 or first game device 100 may be part of, or configured for communication with, a player tracking and/or player loyalty system operating in connection with one or more game operators. In some such embodiments, a server 300 or first game device 100 may transmit an achievement outcome, optionally with identification information for the user and/or first game device 100 earning the achievement outcome, to the player tracking and/or player loyalty system. The achievement outcome may be accessed by the user at a second game device 200 in communication with the player tracking and/or player loyalty system. For example, in one optional embodiment, the user identifies himself or herself at the second game device 200 using an encoded card, personal identification number ("PIN"), user number or identifier, radio frequency identification ("RFID") transponder, mobile device, or other means for identifying and/or authenticating the user to the second game device 200. In some embodiments, a user who is not already registered with the player tracking and/or player loyalty system may be invited to register with a player tracking and/or player loyalty system upon receiving an achievement outcome, which may be facilitated by first game device 100, at least in order to transmit information regarding the achievement outcome to the player tracking system for purposes of advantageously allowing the user to subsequently obtain a resulting benefit of, or access to, an optional feature at a second game device 200 as further described in embodiments herein.

In another example, a server 300 or first game device 100 is part of, or configured for communication with, a social network site. In some such optional embodiments, a server 300 or first game device 100 may transmit an achievement outcome to the social network profile for the user. The achievement outcome may be accessed at a second game device 200 which communicates with the social network. For example, the second game device 200 may communicate via the world wide web, virtual private network ("VPN"), local area network ("LAN"), wide area network ("WAN"), mobile broadband, WiFi, or the like with the social network. Optionally, the user's identity is also transmitted, such as through a username and password, biometrics, caller ID, automatic number identification ("ANI"), account number, IP address, or other identifying data, to access the correct profile on the social network. The user's achievement outcomes may then be transmitted from the server 300 to the second game device 200 where the game conducted at the second game device 200 may utilize the achievement outcome and/or the optional feature associated therewith.

In an optional embodiment, optional features may be associated with price selection similar to the price selection discussed above with respect to achievement games and achievement outcomes. That is, in an optional embodiment, a first price may be associated with an optional feature and a different second price may be associated with an enhanced optional feature, with the price difference between the first price and the second price going to a designee other than the operator of the game. For example, the price difference could go to the purchase of a good or service, to be stored as a deferred value, to an investment, to a charity, or the like. In one such optional embodiment, an achievement outcome having a first value is associated with an optional feature and an achievement outcome having a different second value is associated with an enhanced optional feature. The value difference between the first value and the second value could be directed to a designee other than the player earning, and redeeming, sharing, exchanging, selling, or trading, the achievement outcomes.

The second game device 200 conducts the game. In an optional embodiment, the game conducted is dynamic, with the features of the game determined based on achievement outcomes, if any, received at the second game device. For example, the base game may be a wagering game of any format, such as a reel slot game, live or electronic card game, video poker game, blackjack game, roulette game, keno or other numbers game, baccarat game, lottery game, pull-tab game, or any other game in which a mandatory wager is received from a user (such as through a second game device interface 202), with the wager staked on the outcome of the game. The optional features may take any form, including by changing or enhancing the base game, changing the wagering conditions, adding to the base game, or the like. For example, the optional feature(s) may change or enhance the base game by adding outcomes not otherwise available (such as by adding symbols or playing cards to a game), changing the odds within a game (such as by altering the symbol distribution or playing card constitution within a game), change the pay outs within a game (such as by changing the pay tables), or the like. In another example, the optional feature(s) may change the conditions of the game or conditions within a game without necessarily changing the game outcome (such as by changing the game pieces, for example, from Jacks to Aces, changing the numbers or locations of numbers in a Keno card, changing the symbols or locations of symbols in a reel slot matrix, or the like). In another example, the optional feature(s) may change the wagering conditions by providing additional funds for wagering (such as through match play and free play), altering denominations of wagers input by the user, altering wager amounts input by the player, or the like. In yet another example, the optional feature(s) may add to a base game by providing bonus pay outs, bonus games, bonus wagers, secondary or supplemental pay outs, top-box games, additional base game wagering options, or any other additional feature in a base game. It is contemplated that these examples are intended to be illustrative only and that the optional features may take many other forms.

If an achievement outcome is received at the second game device 200, the base game is conducted including at least one optional feature. In one optional embodiment, the optional feature is randomly selected by the second game device 200. In another optional embodiment, the optional feature may be selected by the user. For example, a menu of optional features may be presented to a user and the user may "buy" or exchange an achievement outcome for a selected optional feature. In one such optional embodiment, optional features may vary in "price" and achievement outcomes may vary in "value" and the user may be only be permitted to "buy" or exchange an achievement outcome (or multiple achievement outcomes) with sufficient value to cover the price of the selected optional feature. In yet another optional embodiment, achievement outcomes may be correlated to specific optional features. In one such optional embodiment, an achievement outcome may be exchanged only for the associated optional feature(s).

The nature of the optional features may vary depending on the optional embodiment. For example, in one optional embodiment, the optional features may be reserved exclusively for achievement outcomes. That is, in one optional embodiment, exclusive optional features may only be available when an achievement outcome has been received at the second game device 200. In such an optional embodiment, only the base game is conducted when no achievement outcome is received at the second game device. In another optional embodiment, a game may include exclusive optional features and non-exclusive optional features. In such an optional embodiment, exclusive optional features are available only when an achievement outcome has been received at the second game device 200. When no achievement outcome is received at the second game device 200, the base game is conducted only with non-exclusive optional features. Depending on the optional embodiment, exclusive optional features may replace or supplement non-exclusive optional features. In yet another optional embodiment, optional features may be available in any base game, with the achievement outcome merely changing the conditions for activating the optional feature. For example, in one optional embodiment, optional features may be available in the base game, but only triggered upon random events unless an achievement outcome is received at the second game device 200 in which case the achievement outcome is more likely, or certain, to be triggered. In such an example, receipt of an achievement outcome increases the likelihood that an optional feature will be triggered as compared to a game in which no achievement outcome is received. In yet another optional embodiment, the optional features may transform depending on the receipt of an achievement outcome or the achievement outcome received. For example, an optional feature for a game may include a randomly-triggered "mystery" jackpot but when an achievement outcome (or a specific type of achievement outcome) is received, the "mystery" jackpot may transform to increase in value, frequency, or the like.

It should be further noted that an achievement outcome may correlate to different optional features depending on the game in which the achievement outcome is received, how the achievement outcome is exchanged, when the achievement outcome is used, the environment of the game in which the achievement outcome is received, and the like. For example, a user may be provided an incentive to use achievement outcomes for optional features early in a game, by diminishing the value, quantity, or other measure of the achievement outcome and/or optional feature(s) available over time. Thus, in one example, an achievement outcome may be exchanged for a 5× payout multiplier in the first ten games at a second game device 200 but only a 2× payout multiplier if used after the first ten games at a second game device 200. Conversely, a user may be provided an incentive to extend play by increasing the value, quantity, or other measure of the achievement outcome and/or optional feature(s) over time, thereby encouraging the user to continue play and "save" achievement outcomes for later use. Thus, in one example, an achievement outcome may be exchanged for match play up to $10 in the first five games, match play up to $15 in the second five games, and match play up to $20 if used after the first ten games at a second game device 200.

Additionally, the achievement outcome and/or optional feature available as a result of the achievement outcome may vary depending on the game at a second game device 200. For example, different optional features may be available depending on whether the game at a second game device 200 is a reel slot game, video poker game, video blackjack game, video keno or other numbers game, or the like. Thus, in a slot game, the optional feature may be a free re-spin, while in a video poker game, the optional feature may be a wild card.

It should be noted that, in an optional embodiment, the optional feature may only affect the display or the conduct of the game, without affecting the structure of the underlying game. For example, in an optional embodiment applied to a wagering game, the optional features may, or may not, affect the odds of winning the game, the payback percentage, hold, expected value or return, or other metric by which the game is measured. Thus, in one such example, the optional features may include an exclusive bonus game that is displayed and/or conducted differently from a non-exclusive bonus game. However, the odds of winning the exclusive bonus game and the expected value of the exclusive bonus game may be identical to the odds of winning and expected value of the non-exclusive bonus game even though the game is display and/or conducted differently. For example, in one such optional embodiment, a non-exclusive optional feature for a reel slot game may be a "free spin" bonus game in which the existing reels spin freely and any awards associated with the free spins are awarded as a bonus prize. An exclusive optional feature may be an interactive bonus game in which the second game device 200 receives input from a user to, for example, select objects, control objects, initiate actions, or the like, to complete a bonus game and earn a bonus prize. In one optional embodiment, the expected value of the bonus game is the same in the exclusive optional feature and the non-exclusive optional feature.

In another example, an optional feature may alter the game conducted at the second game device 200 in certain aspects but maintain the overall expected value of the game. For example, an optional feature may include a pay table for a base game with higher payouts than would exist without the optional feature, i.e., the optional feature is an enhanced pay table. To maintain the overall expected value of the game, however, the distribution of the outcomes associated with the optional feature, e.g., the enhanced pay table, may be altered so that the frequency of outcomes with the higher payouts is, for example, reduced, while the frequency of other outcomes with no or lower payouts is, for example, increased. In another example, the optional feature is a progressive or jackpot payout which does not alter any of the other payouts in the pay table, but may result in a re-allocation of the outcomes so that the overall expected value of the game remains constant. In these cases, a user may have a different game experience at a second game device 200 based on whether the user utilized an achievement outcome to obtain an optional feature, even though the user did not obtain an advantage in the game compared to other users who do not have access to the optional feature.

Conversely, as discussed above, in another optional embodiment, a user with access to optional features through achievement outcomes may, in fact, have access to a game that has greater odds of winning, higher expected value, higher payback percentage, lower hold, or the like, than the game as conducted without the optional features. In other words, in an optional embodiment, a user with access to optional features may have an advantage in a game compared to users without access to optional features in the game by, for example, having access to higher payouts, more frequent payouts, more frequent bonus features and/or bonus payouts, higher paying bonus features, higher bonus payouts, more frequent winning outcomes (or less frequent losing outcomes), or the like. It is contemplated that the difference in game experience could be accompanied by presenting and/or conducting the game differently when the optional feature is included or, in an alternate optional embodiment, the game may be presented and/or conducted the same whether or not the optional feature is included, such that the outward appearance is of the same game even though the game itself is different.

In an optional embodiment, the user may be permitted to input an election when to utilize an achievement outcome. For example, in an optional embodiment, a user may select the specific game to use an achievement outcome for an optional feature. It is contemplated that such a selection could occur at the beginning of a game, during a game, or at the end of a game, depending on the embodiment, the base game, and/or the optional feature. For example, in an optional embodiment, the optional feature could be a match play or free play, in which the user may be required to select the optional feature at the beginning of a game. In another example, the optional feature could be a second chance (such as a re-deal or a re-spin) in which the user may be required to select the optional feature at the end of a game.

Notwithstanding the foregoing, it is also contemplated that, in an optional embodiment, the user may not be provided with any selection regarding when or how to use an optional feature associated with an achievement outcome. For example, the achievement outcome may be immediately exchanged for an optional feature when it is received at the second game device 200, without any selection from the user.

It is also contemplated that the user may, or may not, be informed of the optional feature awarded as a result of an achievement outcome. As noted above, in one optional embodiment, the player participates in the selection of the optional feature to be utilized in a game based on the achievement outcome. In alternate optional embodiments, the optional feature may be concealed from the user and the "mystery" optional feature may only become apparent during the game. The selection of the "mystery" optional feature in such an optional embodiment may be done randomly, quasi-randomly (e.g., in a weighted random fashion), or based on a predetermined selection, such as through a database that correlates achievement outcomes with specific, albeit concealed, optional features or a rotating selection which is non-random, but also not displayed to the user.

It is noted that an optional feature may persist over a span of one or more games. That is, an optional feature could continue to be applied to base games for a defined or indefinite period of time. For example, an optional feature may be applied for a specific number of games, a random number of games, until exhausted (such as free play, optional second chances, or the like), or the like.

In an optional embodiment, an optional feature may relate directly to the achievement outcome. For example, in one optional embodiment, the achievement outcome in an achievement game at a first game device 100 may include collecting the optional features usable in a game at a second game device 200. Thus, in one such example, an achievement game may be a video game with a "scavenger hunt" achievement outcome that is fulfilled by collecting objects such as playing cards, slot reel symbols, keno numbers, playing tiles, or the like. When the achievement outcome is utilized in a game at a second game device 200, the optional feature may be the availability of the objects collected in the achievement game. For example, if a user collected the Ace of hearts and the King of spades in the achievement game at a first game device 100, an optional feature in a video card game at a second game device 200 may include the feature of adding the Ace of hearts and/or the King of spades to the user's hand, trading the Ace of hearts and/or the King of spades for a card in the user's hand, or the like. It is contemplated that the scavenger hunt may work in both directions, with objects collected in a game at the second game device 200 that are usable for optional features in an achievement game at the first game device 100. For example, if a player is dealt a card with a token symbol superimposed on it, a token may be stored at a server 300 and/or a first game device 100 for use in an achievement game to exchange for thematic or game play features in the achievement game.

In an optional embodiment, the wager staked on the game is resolved based on the base game including optional features, if any, applied to the base game. In one such optional embodiment, the outcome of a base game is determined entirely or predominantly based on chance, e.g., a random event, and results in either a loss, in which case the wager is collected, or a win, in which case a payout is issued. Certain base games may also include pushes or ties, in which case the wager is returned. In an optional embodiment, as discussed above, the optional feature may serve to alter the outcome of the game, alter how the wager is resolved, provide a second chance to obtain a different outcome, or the like.

In an optional embodiment, achievement outcomes may also be obtained in the game. That is, the game at the second game device 200 may include achievement outcomes that may, in turn, be used at the same second game device 200, at a different second game device 200, at a first game device 100, or the like. In this manner, play on the first game device 100 may encourage play on a second game device 200 and play on the second game device 200 may encourage play on other second game devices and/or a first game device 100. The achievement outcomes obtained in the game at the second game device 200 may spawn additional achievement outcomes. It is contemplated that achievement outcomes may have differing values, durations, and uses, and may be earned at different rates, depending on the attributes of the player, the player's status, the game, the nature and type of achievement outcome, and the like.

While certain embodiments of the present invention have been shown and described it is to be understood that the embodiments of present invention shown and described are subject to many modifications and changes without departing from the spirit and scope of the invention presented herein.

I claim:

1. A system for conducting a game for at least one player, said system comprising:

a first game device having a first game device interface, said first game device configured to execute program instructions to conduct a self-contained achievement game, said achievement game including at least one achievement outcome that may be earned through said achievement game; and a second game device having a second game device interface, said second game device configured to execute program instructions to conduct a game logically independent from said achievement game, wherein said game includes at least a base game and at least one exclusive optional feature which alters said base game, wherein said second game device is configured to receive said achievement outcome, if any, earned in said achievement game conducted at said first game device, determine the exclusive optional feature, if any, associated with any achievement outcome received, and conduct said base game including said at least one exclusive optional feature only when an achievement outcome associated with said at least one exclusive optional feature is received otherwise said second game device is configured to conduct said base game without said at least one exclusive optional feature.

2. The system of claim 1 wherein said second game device receives said achievement outcome from said first game device.

3. The system of claim 2 wherein said second game device further comprises a receiver and said first game device further comprises a transmitter and said second game device is configured to receive said achievement outcome via transmission from said first game device to said second game device.

4. The system of claim 1 further comprising a server in communication with said first game device and said second game device.

5. The system of claim 4 wherein said first game device is configured to transmit said achievement outcome to said server and said second game device is configured to retrieve said achievement outcome from said server.

6. The system of claim 1 wherein said game further includes non-exclusive optional features, and said second game device is configured to conduct said base game including at least one of said exclusive optional features only when said associated achievement outcome is received by said second game device, otherwise said second game device is configured to conduct said base game including non-exclusive optional features without said at least one exclusive optional feature.

7. The system of claim 1 wherein said second game device is configured to select said at least one exclusive optional feature conducted with said base game.

8. The system of claim 1 wherein said second game device is configured to receive an election through said second game device interface to select said at least one exclusive optional feature conducted with said base game.

9. The system of claim 1 wherein said achievement outcomes are consumable and said program instructions at said first game device further comprise debiting achievement outcomes after being used for an exclusive optional feature.

10. The system of claim 1 wherein said achievement outcomes are non-consumable and said program instructions at said first game device further comprise retaining said achievement outcome after being used for an exclusive optional feature.

11. A system for conducting a game for at least one player, said system comprising:

a server;

a first game device in communication with said server, said first game device having a first game device interface, said first game device configured to execute program instructions to conduct a self-contained achievement game, said achievement game including at least one achievement outcome that may be earned through play of said achievement game, and communicate said achievement outcome to said server; and a second game device in communication with said server, said second game device different from said first game device, said second game device having a second game device interface, said second game device configured to execute program instructions to conduct a game logically independent from said achievement game, wherein said game includes at least a base game and at least one exclusive optional feature which alters said base game, wherein said second game device is configured to (a) communicate with said server to receive said achievement outcome, if any, earned in said achievement game conducted at said first game device, (b) determine said at least one exclusive optional feature, if any, associated with any achievement outcome received, and (c) conduct said base game including feature associated with received from said server, otherwise said second game device is configured to conduct said base game without said at least one exclusive optional feature.

12. The system of claim 11 wherein said first game device is configured to transmit said achievement outcome to said server and said second game device is configured to retrieve said achievement outcome from said server.

13. The system of claim 11 wherein said game includes non-exclusive optional features, and said second game device is configured to conduct said base game including at least one of said exclusive optional features only when said associated achievement outcome is received by said second game device, otherwise said second game device is configured to conduct said base game including non-exclusive optional features without said at least one exclusive optional feature.

14. The system of claim 11 wherein said second game device is configured to select said at least one exclusive optional feature conducted with said base game.

15. The system of claim 11 wherein said second game device is configured to receive an election through said second game device interface to select said exclusive optional feature conducted with said base game.

16. The system of claim 11 wherein said achievement outcomes are consumable and said server is configured to debit achievement outcomes after being used for an exclusive optional feature.

17. The system of claim 11 wherein said achievement outcomes are non-consumable and said server is configured to retain said achievement outcome after being used for an exclusive optional feature.

18. The system of claim 11 wherein an achievement outcome having a first value is associated with an exclusive optional feature and an achievement outcome having a different second value is associated with an enhanced optional feature, with the value difference between the first value and the second value going to a designee other than said player earning said achievement outcomes.

* * * * *